May 27, 1941.
C. E. HEDRICK
2,243,154
POULTRY FEEDER
Filed Oct. 12, 1939
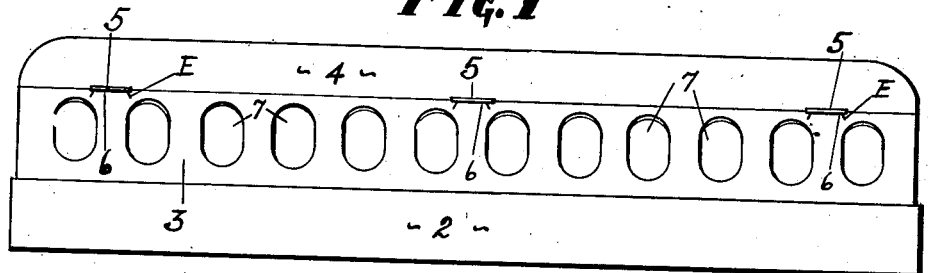
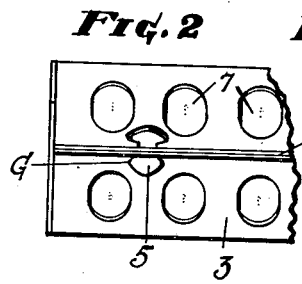 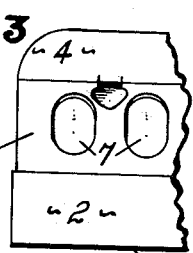 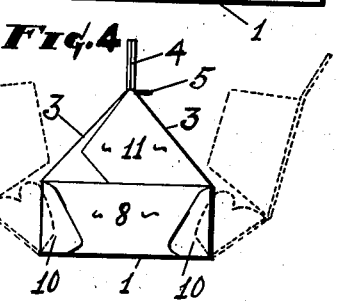
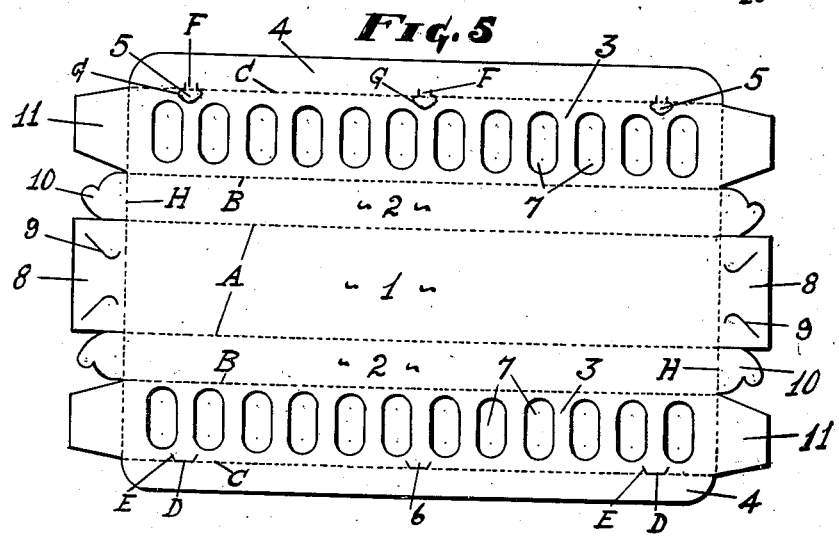
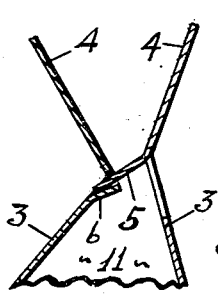 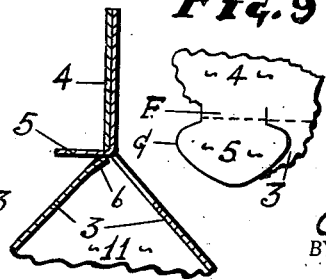 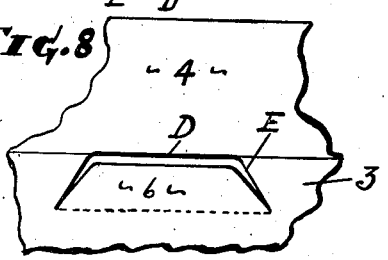
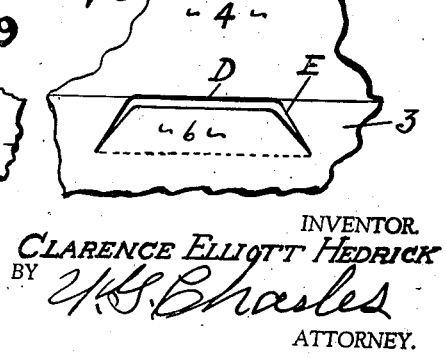
INVENTOR.
CLARENCE ELLIOTT HEDRICK
BY U.S. Charles
ATTORNEY.

Patented May 27, 1941

2,243,154

UNITED STATES PATENT OFFICE 2,243,154

POULTRY FEEDER

Clarence Elliott Hedrick, Newton, Kans.

Application October 12, 1939, Serial No. 299,127

3 Claims. (Cl. 119—61)

My invention relates to improvements in a poultry feeder and has for its principal object a feeder constructed from a single sheet of material and being scored to accurately bend the sheet as an enclosure, and a locking means integral with the sheet to hold the lapped and otherwise jointed portions firmly together to avoid the result of rebound and collapse of the assembly.

A further object of my invention is to construct a poultry feeder in such a way as to avoid the use of tools in the assembly of the sheet portions and connecting means for the relative parts to form a poultry feed container as herein set forth, and furthermore, the material being in flat sheet form is convenient shipping and storing the same.

A still further object of my invention is to produce sanitary, inexpensive poultry feeders to be discarded and replaced from time to time as the case may require.

A still further object of my invention is to construct a feeder having an upward extending ridge of considerable width on which to place advertisements, the space thereof being unobstructed, as the means for locking the ridge portions together is at the low extremity where the ridge portions bend and integrally join their respective apertured slanting top portions of the feeders, said locking means consisting of a tongue partially severed from one top portion while the slits for their engagement are likewise restricted to the other top portions.

A still further object of my invention is to provide a tongue structure partially severed from the slanting portion of the top having outwardly extending barbs from its oppositely disposed edges and being adjacent the free end thereof, and a slit through the opposite portion of the top to align with the tongue, the ends of the slit diverging downward to form a lip of ample width whereby the barbs of the tongue will freely pass through the slit at the base or bending point of the lip, and by upward movement of the tongue, the barbs thereof will overlap the slanting top at the upper extremity of the convergence and will be retained upward by the lip tension thereunder.

These and other objects will hereinafter be more fully explained, reference being had to the accompanying drawing forming a part of this specification, in which like characters will apply to like parts in the different views.

Referring to the drawing:

Fig. 1 is a side view of the poultry feeder.

Fig. 2 is a fragmentary plan view of Fig. 1.

Fig. 3 is a fragmentary side view of the feeder opposite to that of Fig. 1 to illustrate the position of the point from which the tongue is severed, the tongue being engaged by the slit in the opposite slanting portion of the top.

Fig. 4 is an end view of the feeder showing the sides partially collapsed by dotted lines.

Fig. 5 is a plan view of the sheet blank.

Fig. 6 is an enlarged sectional view of the ridge portions prior to their parallel engagement to illustrate the position of the tongue as it enters the slit.

Fig. 7 is a sectional view showing the ridge assembly and position of the slit.

Fig. 8 is an enlarged side view illustrating the form and position of the slit.

Fig. 9 is a fragmentary plan view of the top and ridge showing the contour of the tongue as severed from the top.

This invention herein disclosed consists of a bottom 1, side walls 2, that are vertically positioned by bending a blank on lines A respectively, and a top portion 3, extending from each side upward and toward each other by a bend on lines B. Each of said top members has at the outer edge thereof a marginal portion 4 that forms a ridge vertically positioned by a bend at line C, the said marginal portions being attached by tongues 5 spaced therealong and integrally joined adjacent the score for the ridge bend, the tongues being formed by severing the same from their respective top portion as shown in Fig. 3, the unsevered portion being substantially at the score between the top and the ridge and adapted to bend thereat so that the tongues may enter their respective slits positioned in alignment therewith and being in the other or oppositely disposed portion of the top. The slit consists of a straight horizontally disposed portion D and a downward and outward slanting portion E at each end thereof, said last portions diverging in their downward extension to space the lower extremities thereof a greater distance apart than the points where they join the horizontal portions whereby a lip 6 is formed with a rockable free end.

The tongue above referred to consists of a shank F and a barb G outwardly extending from the shank, the points of the barbs being preferably arcuate while the free end or outer extremity of the tongue is arced outward terminating at the arc of each point, respectively, to form a point to serve as a convenience to enter the horizontal portion of the slit and by further movement therethrough the barbs pass downward along the divergence of the slits until they reach the lower extremity thereof, at which point the said barbs are free to pass through without mutilation or bending the same and when returned will engage on the outer side of the top portion as they move toward the said horizontal portion of the slit, at which point the tongue is locked against outward movement, tying the ridge members together, while the lip will engage at its upper free end with the shank of the tongue, closing the opening formed by the slit, whereby the said tongue is substantially locked against removal. The ridge thus formed is adapted to receive advertising matter printed on its entire surface.

Spaced along each top portion 3 is a plurality of elongated ports 7, through which poultry has access to feed placed in the feeder. Each end of the said feeder is closed by a plurality of members outwardly extending from score line H respectively, and on said lines the members will bend for their function as follows:

Each of the end portions 8, that are integral with the bottom may be turned upward at right angles thereto and each has a curved slot 9 near the opposite ends thereof to receive hook members 10, insertible therethrough as securing means for their respective sides at a right angle to the bottom, while extensions 11, functioning as flaps and being joined to their respective ends of each ported top portion, are adapted to interlap each other at their respective ends, also engaging on the inside of portion 8, as closing means for the ends of the said ported top portions.

As heretofore stated, the said poultry feeder is a collapsible structure and the blank from which it is formed has means to secure the folds in operative position as a feeder, the assembly being done by the purchaser of the blanks, the performance of which is accomplished without the use of tools. The feeder thus constructed is an article of manufacture, and the blanks packed in bundles as a convenient storage and shipping means therefor.

And modifications may be made as lie within the scope of the appended claims.

Having fully described my invention what I claim as new and desire to secure by Letters Patent is:

1. In a poultry feeder formed from a single sheet of material comprising a bottom, sides, end walls, two top portions and a ridge, the end walls having interlapping members and tying means to secure said members as closures for the ends of the feeder while the top portions each have extensions bent at right angles toward each other to interlap and being positioned inward of the end walls to retain the said extensions in position to close the ends of the top portions, one of said top portions having slits spaced apart therealong, and barbed tongues carried by the other top portion in registry with the slits, an intermediate portion of the slits being in parallelism with the ridge longitudinally, while a portion at each end of the slits extends divergently into its respective top portion a short distance providing a rockable lip to permit the barbs of the tongues to pass through at the lower extremity of the slits' divergence and the said barbed tongues being forced upward and toward the ridge by the lips to prevent the barbs' removal from the slits whereby the members of the ridge are tied together in parallelism.

2. In a poultry feeder of the class described comprising sides, end walls, and two ported top portions, each top portion having a marginal extension at its outer extremity for parallel engagement when the top portions are rocked together, a tongue formed by partially cutting the same from one top portion, between adjacent ports selectively of said top portion, the tongue having a shank and barbs extending outward each way from the shank, the edges of the shank being in parallelism, the shank being integrally joined to its respective marginal extension where the marginal extension and top portion connect, the tongue having an arcuate point at its outer end, the shank of the tongue being adapted to bend where it joins the intersection of the marginal extensions and top portions, a lip in registry with the tongue and being formed in the other ported top portion, the lip being formed by partially cutting the same therearound, the contour of the lip being formed by severing the same adjacent the top portion's and marginal extension's intersection, paralleling the same, and from thence at each end divergently terminating a short distance along the top portion whereby a slit is formed about the lip to receive the tongue insertible therethrough, said tongue being adapted to move along the upper surface of the lip toward the ends of the divergent portions so that the barbs will pass through the slit for an upward and outward bend of the tongue to tie the marginal extensions together without mutilation of said tongue and lip, there being a plurality of said tongue and lip arrangements spaced along where the marginal extensions and their respective top portions intersect, by which means the marginal extensions are removably tied together substantially as shown.

3. In a poultry feeder made from a single sheet of material, the sheet being scored to define the bending points whereby a bottom, sides, end walls, top portions and ridge members are formed, the end walls of the feeder being arranged to interlap as closing means for the ends of the feeder, a plurality of rockable lips carried by one of the top portions, the lips being cut from their respective top portion whereby an opening is formed at each lip, the free ends of said lips being aligned where the top portions and ridge members intersect, the terminal ends of each lip being divergently formed from the free end of the lip, the divergence terminating at the rockable point of the lip, and a plurality of arcuate pointed tongues having side edges to where their arcs terminate, each tongue having a shank, the edges of which are set inward from the terminal side edges of the said arcuate pointed tongue whereby a barb is formed at each edge of the shank, said tongues and lips being aligned in registry for engagement with each other, the shank and its barbs being of about the same width as the widest portion of the lip opening, and the shank alone being of about the same width as the narrowest portion of the lip opening, at which point the free end of the lip engages and retains the tongue against withdrawal to bind the ridge members together.

CLARENCE ELLIOTT HEDRICK.